(12) United States Patent
Hirsch et al.

(10) Patent No.: US 9,069,993 B2
(45) Date of Patent: Jun. 30, 2015

(54) APPARATUS, SYSTEM, AND METHOD FOR PROTECTING ELECTRONIC DEVICES IN A VIRTUAL PERIMETER

(75) Inventors: Dan F. Hirsch, Cordoba (AR); Cristian F. Bullokles, Cordoba (AR)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 13/992,356

(22) PCT Filed: Nov. 10, 2011

(86) PCT No.: PCT/US2011/060119
§ 371 (c)(1),
(2), (4) Date: Jun. 7, 2013

(87) PCT Pub. No.: WO2013/070222
PCT Pub. Date: May 16, 2013

(65) Prior Publication Data
US 2013/0276152 A1 Oct. 17, 2013

(51) Int. Cl.
G06F 21/00 (2013.01)
G06F 21/88 (2013.01)
G06F 21/62 (2013.01)
H04W 12/08 (2009.01)

(52) U.S. Cl.
CPC ............ *G06F 21/88* (2013.01); *G06F 21/6218* (2013.01); *G06F 21/6281* (2013.01); *G06F 21/629* (2013.01); *H04W 12/08* (2013.01); *G06F 2221/2145* (2013.01); *G06F 2221/2149* (2013.01); *G06F 2221/2141* (2013.01)

(58) Field of Classification Search
CPC . G06F 21/88; G06F 21/00; G06F 2221/2111; G06F 21/85; G06F 21/82
See application file for complete search history.

(56) References Cited

U.S. PATENT DOCUMENTS

| | | | |
|---|---|---|---|
| 2002/0122055 A1* | 9/2002 | Parupudi et al. | 345/737 |
| 2008/0094230 A1 | 4/2008 | Mock | |
| 2009/0249443 A1* | 10/2009 | Fitzgerald et al. | 726/2 |
| 2010/0229220 A1 | 9/2010 | Tsai | |
| 2011/0090886 A1 | 4/2011 | Park | |
| 2011/0246612 A1 | 10/2011 | Buchhop | |

FOREIGN PATENT DOCUMENTS

| | | |
|---|---|---|
| JP | 2007019748 | 1/2007 |
| JP | 2008-085786 | 4/2008 |
| JP | 2008-243178 | 10/2008 |

OTHER PUBLICATIONS

Int'l Search Report and Written Opinion mailed Jul. 9, 2012 for Int'l Patent Application No. PCT/US2011/060119.
Japanese Office Action, Application No. 2014-541017, May 13, 2015, 4 pages.

* cited by examiner

*Primary Examiner* — Izunna Okeke
(74) *Attorney, Agent, or Firm* — Blakely, Sokoloff, Taylor & Zafman LLP

(57) ABSTRACT

Described herein are apparatus, system, and method for protecting electronic devices through the creation of a virtual perimeter among the electronic devices. The virtual perimeter may be generated by the electronic devices themselves. The method performed by an electronic device comprises: identifying a current context; receiving a role, according to the current context, in a hierarchy of multiple electronic devices, and operating in accordance with the role in the hierarchy within a secure perimeter in the current context around the multiple electronic devices, wherein the hierarchy includes a system of security checks based on context information.

21 Claims, 5 Drawing Sheets

APPARATUS, SYSTEM, AND METHOD FOR PROTECTING ELECTRONIC DEVICES IN A VIRTUAL PERIMETER

CLAIM OF PRIORITY

This application claims the benefit of priority of International Patent Application No. PCT/US2011/060119 filed Nov. 10, 2011, titled "APPARATUS, SYSTEM, AND METHOD FOR PROTECTING ELECTRONIC DEVICES IN A VIRTUAL PERIMETER," which is incorporated by reference in its entirety.

FIELD OF THE INVENTION

Embodiments of the invention relate generally to the field of data and device security. More particularly, embodiments of the invention relate to apparatus, system, and method for protecting for protecting electronic devices through the creation of a virtual perimeter among the electronic devices.

BACKGROUND

These days many people go through their daily activities interacting with a myriad of devices they own, for example, smart-phones, tablet PCs, net-books, laptops, desktop computers, smart televisions (TVs), car onboard systems, photo cameras, infotainment systems, etc. These devices are also called "companion devices" of a person because they are closely associated with the person. Many of these devices are mobile devices and travel with their owners moving around different types of contexts, some private contexts and some public contexts. Examples of private contexts are home, car, office, etc. Examples of public contexts are bar, gym, airport, etc.

Handling multiple devices, especially in public places, gives rise to high risk of losing one of the devices—a device may be stolen or the owner may forget one of the multiple devices at a certain place. For example, a common scene in a bar is people working on their laptops while their smart-phones are on the table. In such a scenario, people may walk away from the bar leaving their smart-phone on the table Likewise, during business travel a person waiting for a flight may try to catch up work and leave behind their laptop in a hurry to find the best seat in the plane. Another example is that during a security check at the airport a person may leave behind their laptop or smart-phone near the X-ray machines trying to run to catch their flight.

One way to protect the data on these devices left behind is to regularly backup data or to synchronize data with previous data versions. However, such methods do not preclude the device from being stolen or lost. Neither do these methods avoid possible access to the data on these devices and usage of the devices.

BRIEF DESCRIPTION OF THE DRAWINGS

Embodiments of the invention will be understood more fully from the detailed description given below and from the accompanying drawings of various embodiments of the invention, which, however, should not be taken to limit the invention to the specific embodiments, but are for explanation and understanding only.

SUMMARY

Figure 1:
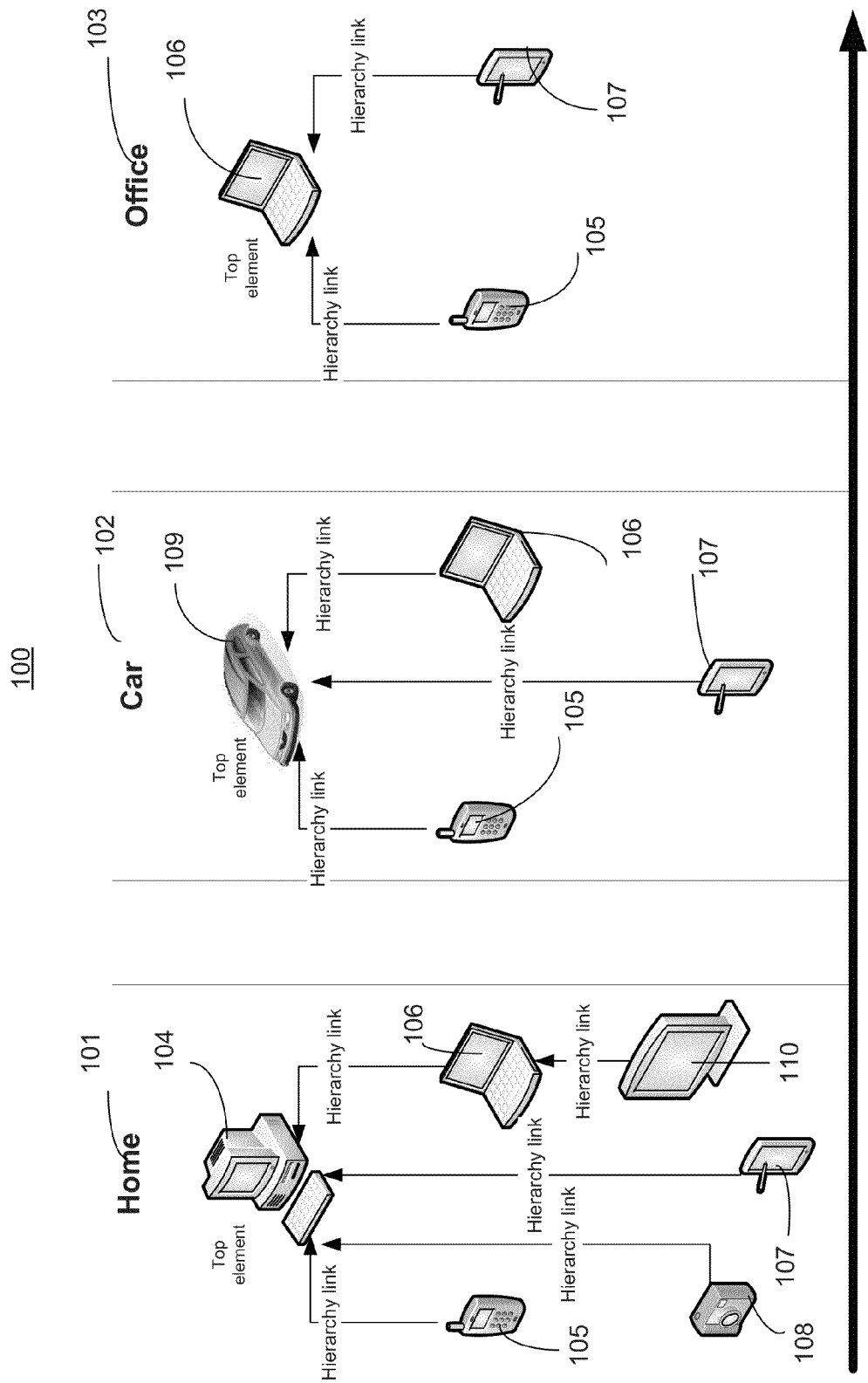
FIG. 1 illustrates various top devices assigned in different contexts, according to one embodiment of the invention.

The following presents a simplified summary of the embodiments of the invention in order to provide a basic understanding of some aspects of the embodiments. This summary is not an extensive overview of the embodiments of the invention. It is intended to neither identify key or critical elements of the embodiments nor delineate the scope of the embodiments. Its sole purpose is to present some concepts of the embodiments of the invention in a simplified form as a prelude to the more detailed description that is presented later.

Embodiments of the invention relate to an apparatus, system, and method for protecting electronic devices through the creation of a virtual perimeter among the electronic devices. The embodiments herein create dynamic hierarchies among electronic devices based on their context.

In one embodiment, the method performed by an electronic device comprises: identifying a current context; receiving a role, according to the current context, in a hierarchy of multiple electronic devices, and operating in accordance with the role in the hierarchy within a secure perimeter in the current context around the multiple electronic devices, wherein the hierarchy includes a system of security checks based on context information. The embodiments herein also include at least one machine-readable storage medium having computer executable instructions stored thereon that, when executed, cause a processor to perform the method discussed herein.

In one embodiment, the electronic device comprises: a logic unit to identify a current context; and a security agent capable of performing a role of a top element in a hierarchy of multiple electronic devices in the current context identified by the logic, wherein the hierarchy includes a system of security checks based on context information to form a secure perimeter in the current context around the multiple electronic devices.

In one embodiment, a server comprises: a security manager module to: register multiple electronic devices; define one or more contexts for the registered multiple electronic devices for providing a secure perimeter in the one or more contexts around the multiple electronic devices; and define a hierarchy for the multiple electronic devices according to the one or more contexts, wherein the security manager module is communicatively coupled to a security agent of an electronic device from among the multiple electronic devices in the hierarchy.

The following description and the annexed drawings set forth in detail certain illustrative aspects of the embodiments of the invention. These aspects are indicative, however, of but a few of the various ways in which the principles of the embodiments of the invention may be employed. The embodiments of the invention are intended to embrace all equivalents in the form of alternatives, modifications, and variations that fall within the broad scope of the appended claims. Other advantages and novel features of the embodiments of the invention will become apparent from the following detailed description of the embodiments of the invention when considered in conjunction with the drawings.

DETAILED DESCRIPTION

Embodiments of the invention relate to an apparatus, system, and method for protecting for protecting electronic devices through the creation of a virtual perimeter among the electronic devices. The embodiments herein create dynamic hierarchies among electronic devices based on their context, The term "context" herein refers to the environment surrounding the electronic devices. For example, electronic devices in a house are part of the home context, electronic devices in a bar are part of the bar context, electronic devices in a car are part of the car context, etc. In one embodiment, contexts can be identified/defined by a user or automatically selected by the electronic device. For example, contexts can be identified from the type of the Wi-Fi network (private, work, public) or its security enabled system (unsecured, Wi-Fi Protected Access (WPA), etc). In one embodiment, Near Field Communications (NFC), which enables exchange of data within four inches, can also be used to determine proximity between the electronic devices in the hierarchy.

These context-aware dynamic hierarchies reduce the risk of burglary and information loss on these electronic devices, In one embodiment, a system of security checks is logically implemented on top of the dynamic hierarchies created among a set of electronic devices. In one embodiment, the system of security checks is based on context variables.

The term "context variables" or "context information" herein refers to one or more of physical proximity between electronic devices, from among the multiple electronic devices, in the hierarchy; logical location of the electronic devices, from among the multiple electronic devices, in the hierarchy; movement of an electronic device relative to other electronic devices from among the multiple electronic devices, in the hierarchy; strength of wireless internet connectivity of an electronic device relative to other electronic devices from among the multiple electronic devices, in the hierarchy; an event detected by soft or hard sensors of an electronic device from among the multiple electronic devices, in the hierarchy; a message received from another electronic device from among the multiple electronic devices, in the hierarchy, the message to indicate an event in the current context, or any other context information that may assist with identifying the safety of the electronic device within the hierarchy.

Location can refer to physical absolute location (e.g., location based on global positioning system) or logical location like the service set identifier (SSID) of a wireless network the electronic device is connected with. Proximity among electronic devices can be calculated from location information including comparison of signal strength in a Wi-Fi network or when two electronic devices are connected to different networks.

In one embodiment, an electronic device identifies a current context and receives a role, according to the current context, in a hierarchy of multiple electronic devices which includes the electronic device. In one embodiment, the multiple electronic devices in the context identify one or more electronic devices as a top element of the hierarchy. The top element plays the role of a leader in the hierarchy and administers any breach of the secure perimeter for the multiple electronic devices in the hierarchy. In one embodiment, the electronic devices in the hierarchy periodically check conformity with one or more context rules established for the hierarchy.

The term "context rules," "rules," or "agent rule" herein refers to rules and conditions for triggering an event if a rule or condition is activated. If a rule is activated, a sequence of events is triggered impacting, at least, the electronic device where the security agent (304 of FIG. 3) is located. When possible, rule activations are also informed to the top element, and may include events among electronic devices (e.g., high-speed synchronization among electronic devices) and/or with the cloud when possible. For example, a context rule for a smart TV in a house, where the house is the current context, may be a physical distance of the smart TV relative to a predetermined position (e.g., front door of the house). A rule may be expressed as: Rule1: if Condition1 (is satisfied) then (execute/trigger) Event1. For example, Rule: If devices are more than 3 meters away from each other then activate Event2.

In one embodiment, the top element may trigger an event when a context rule, from among the one or more context rules, is activated for that hierarchy. In one embodiment, if the context rule is activated for the top element, then all electronic devices in the hierarchy are considered in danger and all the electronic devices may be shut down. In other embodiments, if a context rule is activated for one of the electronic device (which is not the top element) then the top element may shut down that electronic device and take precautionary measures to secure the other electronic devices in the hierarchy.

In the following description, numerous details are discussed to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" herein refers to two or more elements which are in direct contact (physically, electrically, magnetically, optically, etc.). The term "coupled" herein may also refer to two or more elements that are not in direct contact with each other, but still cooperate or interact with each other.

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

FIG. 1 is a scenario 100 with various top electronic devices assigned in different contexts, according to one embodiment of the invention. For example, in the scenario 100, contexts for the electronic devices associated with a user change as the user moves from home to the office. The scenario 100 comprises of three contexts, home 101, car 102, and office 103. While the embodiments herein describe these three contexts, the essence of the invention may be used with any context, for example, airport, bar, gym, shopping mall, etc.

At home 101, which is a private context, a user may have multiple electronic devices including a desktop computer 104, a smart-phone 105, a laptop computer 106, a tablet PC 107, a digital camera 108, a smart TV 110, etc. In one embodiment, to generate a secure perimeter around the context home 101 for the multiple electronic devices in the home 101, a hierarchy of the multiple electronic devices is generated. In one embodiment, the multiple devices have logic which polls all the devices and decides which device or devices should take the role of the top element in the hierarchy.

In one embodiment, the electronic devices in the context (e.g., home 101) are pre-assigned with roles in a hierarchy for that context. In one embodiment, a server (e.g., a cloud server) may assign one or more electronic devices, from among the multiple electronic devices, as the top element. In one embodiment, the electronic devices communicate with one another and elect the top element from among the multiple electronic devices. In such an embodiment, the electronic device may compare a set of criteria for each electronic device and determine which electronic device should be the top element in that hierarchy for that context. For example, in the home 101, the desktop computer 104 is least likely to be stolen and has the most computing power (e.g., bigger memory, easy access to the Internet through wired and wireless means, etc) compared to the digital camera 108 and other electronic devices in the context home 101. In such an embodiment, the electronic devices may elect the desktop computer 104 to be the top element. In one embodiment, the electronic devices in a context execute, in view of the context, a leader election algorithm to identify the top element.

"Leader election algorithm" is a process of designating a single process as the organizer of some task distributed among several computers (electronic devices, or nodes). Before the task is initiated, all network nodes are unaware which node will serve as the "leader," or coordinator, of the task. After a leader election algorithm has been executed, however, each electronic device throughout the hierarchy recognizes a particular, unique electronic device (or set of electronic devices) as the task leader, i.e. top element.

In one embodiment, as the user moves from the home context 101 to a car context 102, the context changes and so the hierarchy of the multiple electronic devices in the new context, i.e. car context 102, may change accordingly. For example, in the car context 102 the on board computer system in the car 109 may become the top element. As mentioned above, the top element may be assigned by the user, elected by mutual consent among the electronic devices in the context, or selected by means of executing a leader election algorithm. In this example, the car 109 is the top element and the hierarchy comprises of the car 109, the smart-phone 105, laptop 106, and the tablet PC 107.

In one embodiment, the context rule dictates when an event is triggered. In one embodiment, when the user leaves the car and forgets its smart-phone 105 in the car, a context rule may be activated and an event triggered by the top element indicating that the user has left behind its smart-phone 105 while the user took with it the other electronic devices (the laptop 106 and the tablet PC 107). In one embodiment, if the car is stolen then the top element triggers an event (according to the defined context rule) that may shut down the car, lock its doors, and windows, turn off all electronic devices in the hierarchy of the car context 102, synchronize data from all the electronic devices with the home desktop 104 or a cloud computer (not shown).

In one embodiment, as the user moves from the car context 102 to the office context 103, the hierarchy of the electronic devices is dynamically modified. The term "dynamic" herein refers to an automatic event which takes place in real-time, for example, a few seconds. At the office context 103, the laptop 106 may be the top element of the hierarchy comprising the laptop 106, smart-phone 105, and tablet PC 107. In the office context 103, the laptop 106 is the most likely device to be the top element because it is least likely to be lost. However, if the laptop 106 is lost in the office context 103 (e.g., due to a burglary), then in one embodiment all electronic devices in the hierarchy of the office context 103 are disabled.

Figure 2:
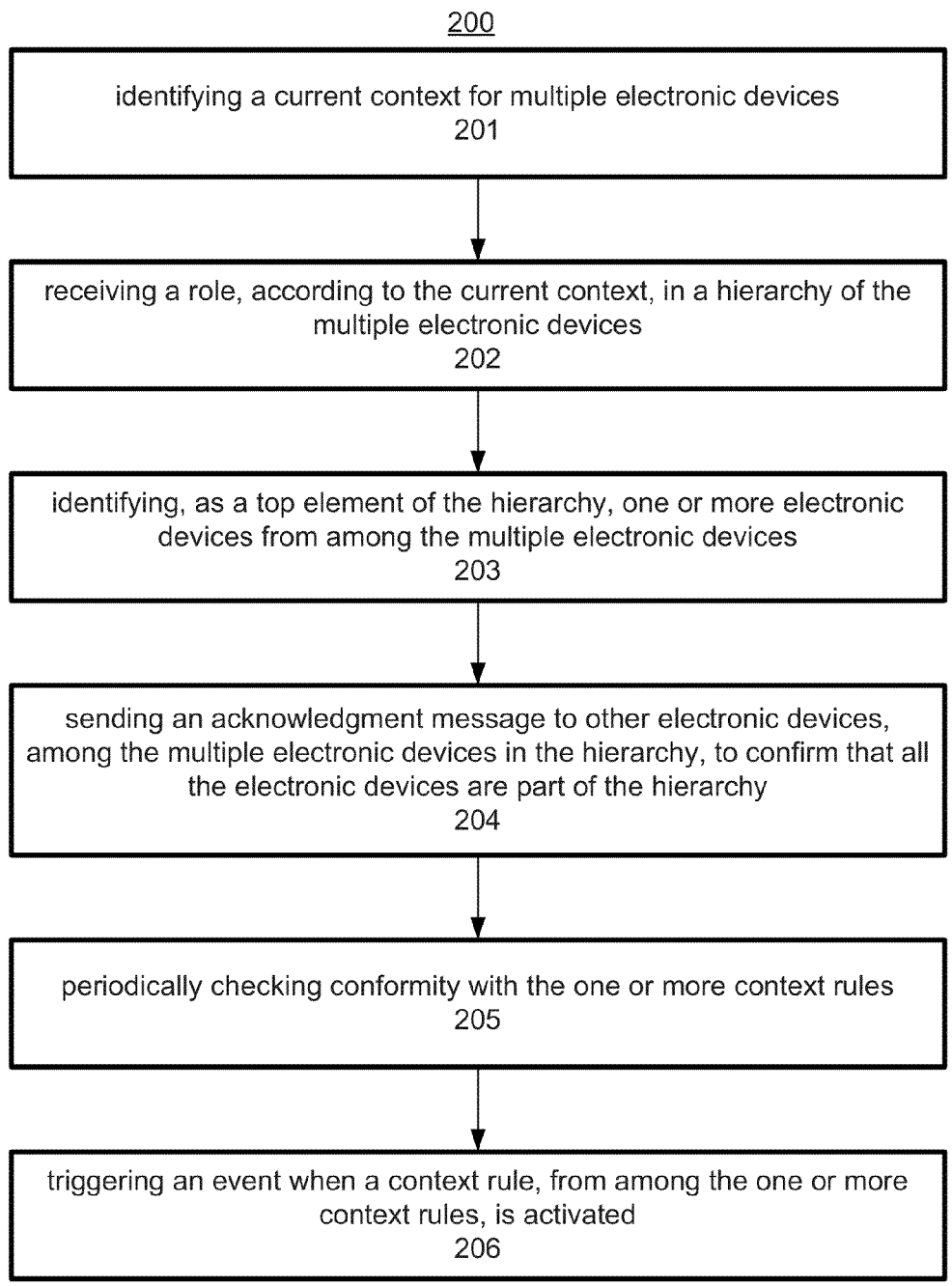
FIG. 2 is a method flowchart performed by an electronic device to provide or contribute towards a context-aware secure perimeter of multiple devices, according to one embodiment of the invention.

FIG. 2 is a method flowchart performed by an electronic device to provide or contribute towards a context-aware secure perimeter of multiple devices, according to one embodiment of the invention. Although the blocks in the flowchart 200 are shown in a particular order, the order of the actions can be modified. Thus, the illustrated embodiments can be performed in a different order, and some actions/blocks may be performed in parallel. Additionally, one or more actions/blocks can be omitted in various embodiments for providing a secure perimeter for multiple electronic devices. The flowchart of FIG. 2 is illustrated with reference to the embodiments of FIG. 1 and FIGS. 3-5.

At block 201, the electronic device (e.g., laptop 106) identifies a current context for multiple electronic devices including the electronic device. As discussed with reference to FIG. 1, the context of the multiple electronic devices changes as the user of those multiple electronic devices moves from one context to another. For example, as the user moves from the home context 101 to the office context 103, the types of multiple electronic devices associated with the user change and so the hierarchy of those electronic devices changes. At block 202, the electronic device receives a role, according to the current context, in a hierarchy of the multiple electronic devices, wherein the hierarchy includes a system of security checks based on context information to form a secure perimeter in the current context around the multiple electronic devices.

In one embodiment, the role may be a role of a top element or a role of a subordinate element (which is not the top element) in the hierarchy. At block 203, the electronic device identifies, as a top element of the hierarchy, one or more electronic devices from among the multiple electronic devices. As discussed above, identifying the top element of the hierarchy comprises performing at least one of: electing, as the top element, one or more electronic devices from among the multiple electronic devices; or executing, in view of the current context, a leader election algorithm to identify the top element. In one embodiment, the electronic devices may receive a notification of identity of the top element from another electronic device such as a server. The method further comprises operating in accordance with the role in the hierarchy within a secure perimeter in the current context around the multiple electronic devices, wherein the hierarchy includes a system of security checks based on context information.

The definition of the top element depends on the context of the multiple electronic devices. The top element is a device (or a set of devices) that has the least probability to be lost or stolen in a context.

For example, at the home context 101, the desktop computer 104 may be identified as a top element, versus the laptop 106 or the smart-phone 105, etc. In one embodiment, a game console or a smart TV may be considered as a top element in the home context 101. In other home contexts such as vacation home, or rental home, or when the owner of the house is on vacation, the context reality changes and so the hierarchy of the multiple electronic devices may change too. At a bar, the laptop 106 may be the top element versus the smart-phone 105 or the tablet PC 107. On the road during travel, the smart-phone 105 may be a better candidate for being the top element versus the laptop 106 because the smart-phone 105 is most likely to remain in the user's pocket while the laptop 106 is more likely to be stored in a bag that has higher risk of being stolen from the vehicle.

In the embodiments discussed herein, all devices in the hierarchy know which electronic device is the top element. In one embodiment, other devices, nearby, that are not part of the hierarchy may be known by their peer electronic devices for proximity identification.

At block 204, each electronic device sends an acknowledgment message to other electronic devices, among the multiple electronic devices in the hierarchy, to confirm that all the electronic devices among the multiple electronic devices are part of the hierarchy. In one embodiment, this handshake procedure confirms the boundaries of the secure perimeter for a particular context. At block 205, each electronic device periodically checks conformity with the one or more context rules. The term "periodically" herein refers to regular intervals e.g., every 5 seconds. As mentioned above, the system of security checks comprises one or more context rules for each of electronic device among the multiple electronic devices. At block 205, an electronic device within the hierarchy may trigger an event when a context rule, from among the one or more context rules, is activated.

In one embodiment, the event comprises performing a security shut down where the electronic device locks itself and if possible informs the top device of its shut down. In one embodiment, security shut down is akin to activating a panic button. In one embodiment, the electronic device securely shuts down itself or at least one of the electronic devices from among the multiple electronic devices in the hierarchy that causes the triggering of the event.

In one embodiment, the event comprises high-speed synchronization in which data is synchronized with another machine. In one embodiment, the other machine is a cloud computing unit. In one embodiment, the process of synchronizing with the other machine comprises copying data from the electronic devices to the cloud computing unit to secure the data in these devices. In one embodiment, all electronic devices, among the multiple electronic devices, are shut down when the top element triggers an event indicating that the top element is outside the secure perimeter.

In one embodiment, the event comprises a hierarchy shut down in which all the multiple electronic devices in the hierarchy are shut down. For example, if a top element is not detected by the electronic devices in the hierarchy then all electronic devices in the hierarchy shut down themselves.

In one embodiment, the event comprises hierarchy lock-in in which when an electronic device in the hierarchy cannot detect all other electronic devices of the hierarchy in the specific context, then a security breach has occurred and the electronic device that triggered the event is shut down.

In one embodiment, the event comprises activating anti-theft protocol for the device that triggered the event or for at least one of the electronic devices from among the multiple electronic devices in the hierarchy. The above list of events is not meant to be an exclusive list of events; other events can be triggered to inform the user that a security breach has occurred against an electronic device within a hierarchy in the context.

In one embodiment, after identifying the current context and defining the hierarchy among the electronic devices, a top element is identified and all electronic devices in the hierarchy of that context acknowledge participating in the development of the secure perimeter among each other in the hierarchy.

In one embodiment, the electronic devices continuously check against context rules. The term "continuous" herein refers to uninterrupted check against context rules. In one embodiment, the electronic devices periodically check against context rules. If a rule is activated, for example, a smart-phone is unexpectedly moved away from a laptop (the top element), an event is triggered, and a sound alarm is fired off or a complete shutdown of the smart-phone is performed.

Figure 3:
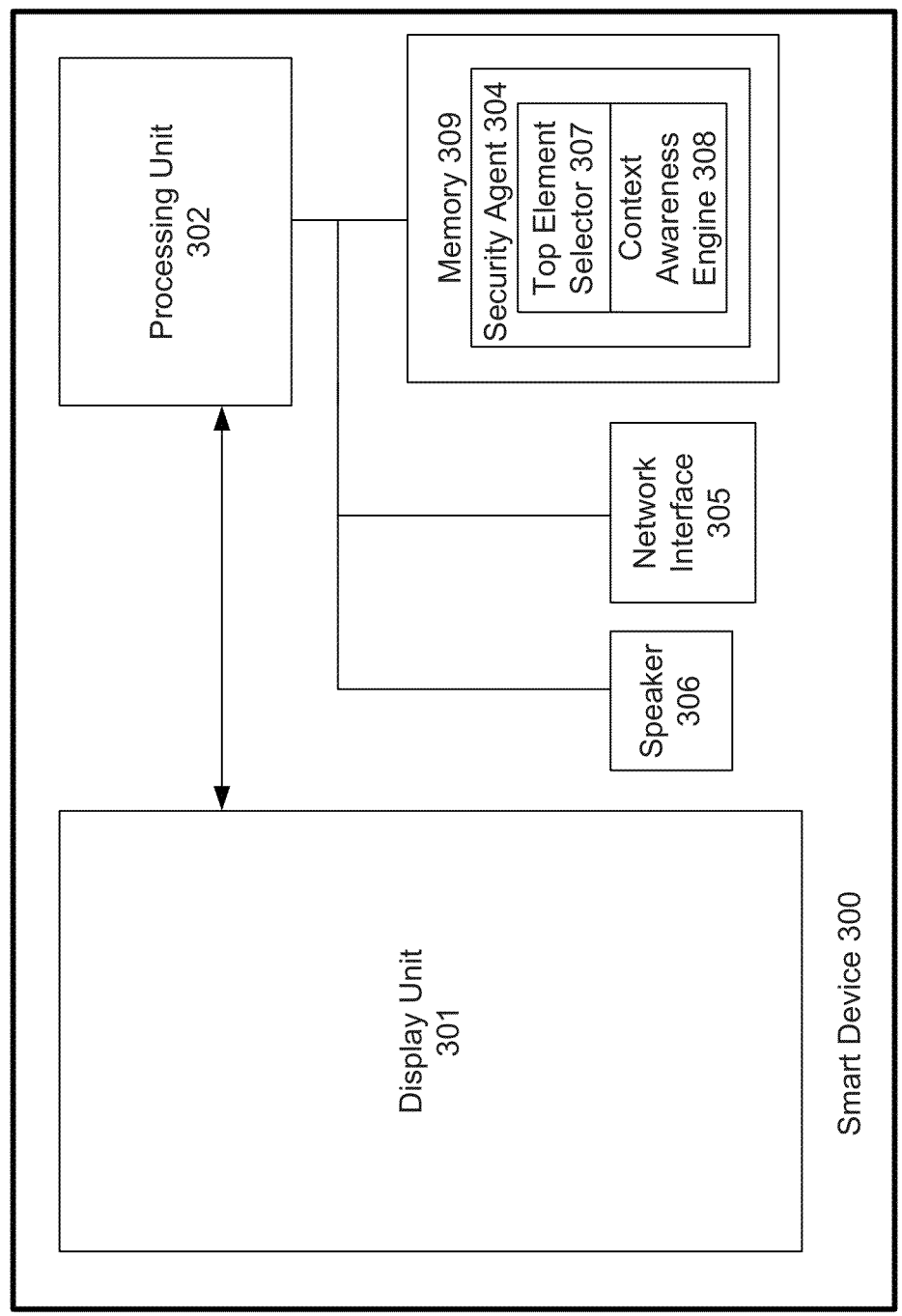
FIG. 3 is an electronic device with logic to provide or to contribute towards a context-aware secure perimeter of multiple devices, according to one embodiment of the invention.

FIG. 3 is an electronic device 300 with logic to provide or to contribute towards a establishing a context-aware secure virtual perimeter of multiple devices, according to one embodiment of the invention. The electronic device 300 comprises a processing unit 302 coupled to a display unit 301. In one embodiment, the processing unit 302 is coupled to at least one machine-readable storage medium, such as machine-readable storage medium 309, having instructions to provide or to contribute towards a context-aware secure perimeter of multiple devices, according to one embodiment of the invention.

Elements of embodiments are provided as a machine-readable medium 309 for storing the computer-executable instructions (e.g., instructions to implement the flowchart of FIG. 2 and any other processes discussed herein). The machine-readable medium 309 may include, but is not limited to, flash memory, optical disks, CD-ROMs, DVD ROMs, RAMs, EPROMs, EEPROMs, magnetic or optical cards, or other type of machine-readable media suitable for storing electronic or computer-executable instructions. For example, embodiments of the invention may be downloaded as a computer program (e.g., BIOS) which may be transferred from a remote computer (e.g., a server) to a requesting computer (e.g., a client) by way of data signals via a communication link (e.g., a modem or network connection) or from an AppStore®, for example, AppUp from Intel®, Android® market place, iTunes®, etc.

The embodiments of the invention can be deployed in multiple form factors and types of connected devices, i.e. the electronic devices that include communication capabilities for them to interact with other electronic devices. For example, embodiments of the invention can be deployed in a desktop computer, a laptop computer, a net-book, a tablet, a notebook computer, a personal digital assistant (PDA), a server, a workstation, a cellular telephone, a mobile computing device, a smart-phone, an e-book reader, an Internet appliance or any other type of connectable device.

In one embodiment, the system 300 comprises a network interface 305 to interact (by wired or wireless means) with other electronic devices in the virtual perimeter. In one embodiment, the network interface 305 is implemented by any type of well known network interface standard including, but not limited to, an Ethernet interface, a universal serial bus (USB) interface, a Peripheral Component Interconnect (PCI) Express interface, a wireless interface and/or any other suitable type of interface. In one embodiment, the wireless interface operates in accordance with, but is not limited to, the IEEE 802.11 standard and its related family, Wi-Fi, Home- Plug AV (HPAV), Ultra Wide Band (UWB), Bluetooth, WiMAX, Near Field, or any form of wireless communication protocol.

While the modules shown in FIG. 3 are depicted as separate blocks within the system 300, the functions performed by some of these blocks may be integrated within a single semiconductor circuit or may be implemented using two or more separate integrated circuits. For example, although the memory 309 is depicted as a separate block in the system 300, it can be incorporated into the processing unit 302. In one embodiment, the system 300 may include more than one processing unit within the processing unit 302.

In one embodiment, the network interface 305 is operable to access other devices in the hierarchy. In one embodiment, the electronic device 300 includes a speaker 306 that is operable to sound an alarm upon triggering of an event. In one embodiment, the processing unit 302 has logic (software or hardware) to provide or to contribute towards a establishing a context-aware secure perimeter of multiple electronic devices. In one embodiment, the logic is a security agent 304.

In one embodiment, each electronic device in the hierarchy includes a security agent. In one embodiment, the security agent includes the logic 307 to become or select a top element. As discussed above, top elements are dynamically defined by the user or automatically detected by the electronic devices in the hierarchy based on context awareness. In one embodiment, for electronic devices that have limited computational ability, e.g., photo camera, the security agent 304 includes enough intelligence to provide some context data to the top element (e.g., its logical or absolute location) and react upon events triggered by the context rules.

In one embodiment, the security agent 304 comprises a context awareness engine 308. In one embodiment, the context awareness engine 308 is capable of generating and receiving information related to device location and proximity of members of the same hierarchy. In one embodiment the context awareness engine 308 includes the context rules that trigger different types of events based on the context information and/or configuration of the security manager, where the security manager resides in another machine, for example, a cloud. In one embodiment, when a rule is activated a sequence of events is triggered affecting, at least, the electronic device where the security agent is located.

Figure 4:
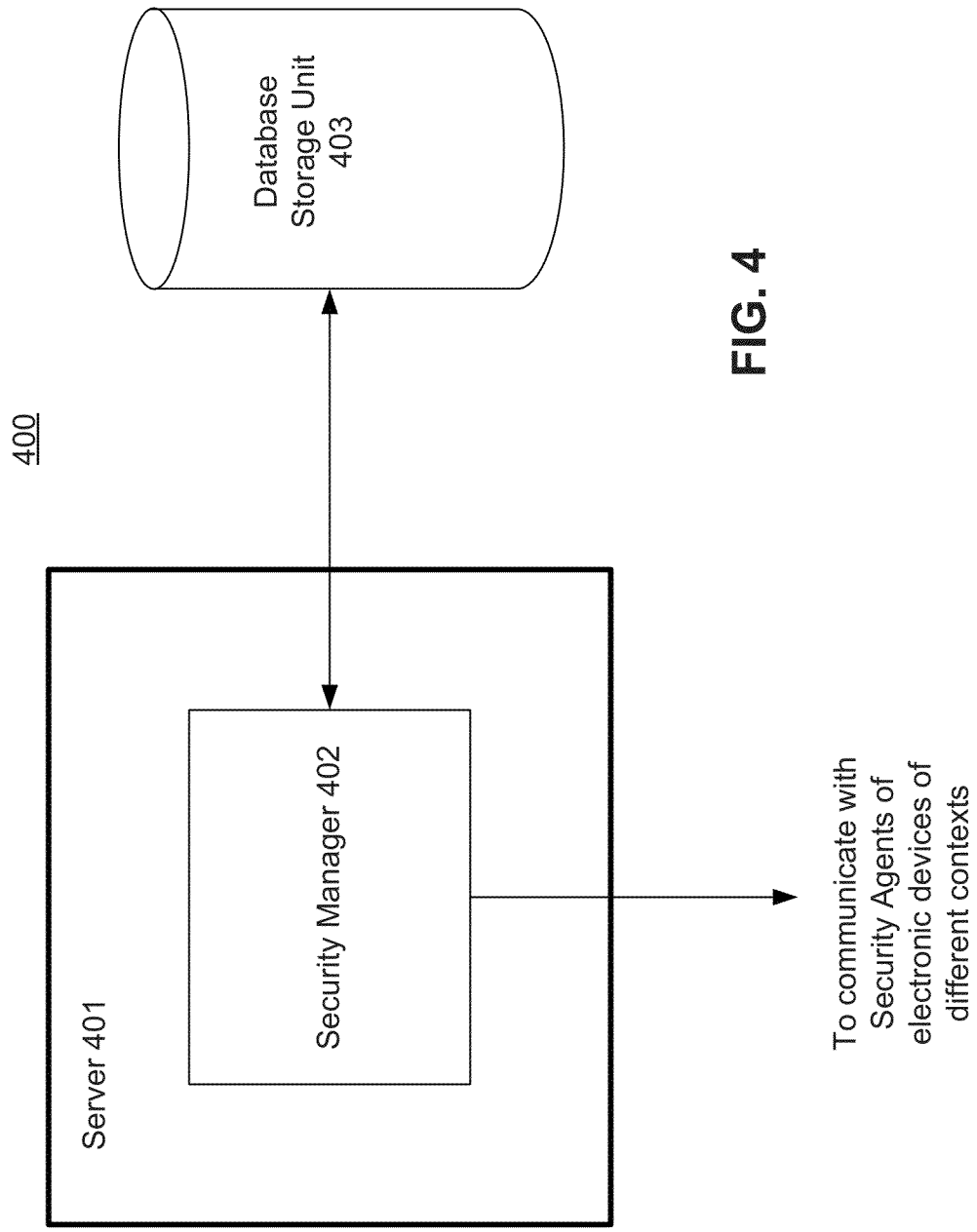
FIG. 4 is a server or central processing unit, coupled to multiple electronic devices, to administer the one or more secure perimeters for multiple devices, according to one embodiment of the invention.

FIG. 4 is a server system 400 for coupling to multiple electronic devices to administer the one or more secure perimeters for multiple electronic devices in one or more hierarchies, according to one embodiment of the invention. In one embodiment, the server system 400 comprises a server 401 (hardware computing/connectable device) including the security manager 402. In one embodiment, the security manager 402 communicates with the security agents (e.g., security agent 304 of FIG. 3) of multiple electronic devices in different contexts. In one embodiment, the security manager 402 allows the configuration of a secure perimeter by defining contexts, hierarchies associated to contexts, and the rules that trigger different types of events (e.g., fast synchronization among devices, firing of an alarm, device shutdown, etc.). In one embodiment, the security manager 402 is in charge of configuration of the security agent of each electronic device. In one embodiment, the security manager 402 resides in the cloud and may be administered from a top element in a hierarchy of a context. In one embodiment, the security manager 402 is implemented as hardware logic coupled to a processor of the server 401 or included in the processor of the server 401. In other embodiments, the security manager 402 is implemented as software modules executed by a processor in the server 401.

In one embodiment, the server 401 couples to a database storage unit 403 to store data of the electronic devices of a hierarchy when an event is triggered. In one embodiment, the security manager 402 (also called security manager module) is operable to: register multiple electronic devices; define one or more contexts for the registered multiple electronic devices for providing a secure perimeter in the one or more contexts around the multiple electronic devices; and define a hierarchy for the multiple electronic devices according to the one or more contexts. In one embodiment, the security manager module 402 defines the hierarchy by registering one or more electronic devices among the multiple electronic devices as a top element in the hierarchy.

In one embodiment, the security manager module 402 is operable to register one or more electronic devices as the top element by performing at least one of: assigning one or more electronic devices, from among the multiple electronic device, as the top element; receiving an input from one or more electronic devices, among the multiple electronic devices, that elected the top element from among the multiple electronic devices; or executing, in view of the context, a leader election algorithm to identify the top element.

Figure 5:
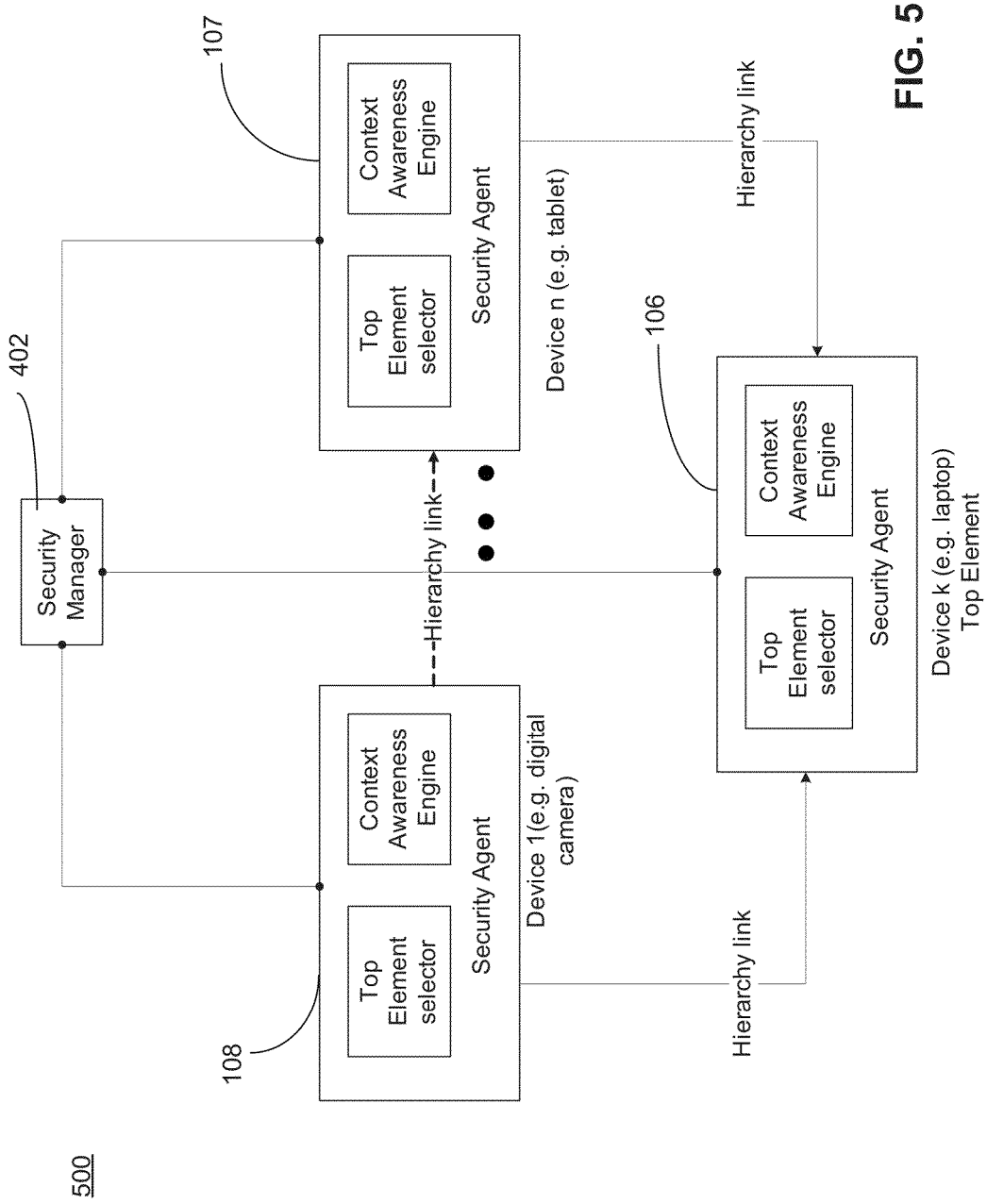
FIG. 5 is a secure system to provide or to contribute towards a context-aware secure perimeter of multiple devices, according to one embodiment of the invention.

FIG. 5 is a secure system 500 to provide or to contribute towards a context-aware secure perimeter of multiple devices, according to one embodiment of the invention. The secure system 500 shows one or more electronic devices 108, 107, and 106 that are communicatively coupled to one another by means of a hierarchy link. The electronic devices 108, 107, and 106 are also communicatively coupled to the security manager 402 because the top element role can dynamically change and so all the electronic devices in a hierarchy may have the ability to communicate with the security manager 402.

In one embodiment, the electronic devices 108, 107, and 106 may have the ability to connect to the security manager 402, but to avoid communication overhead or due to device limitations (e.g. a photo camera), not all electronic devices 108, 107, and 106 in the hierarchy may choose to connect directly to the security manager 402 in the cloud. In one embodiment, when a top element is defined there may be implementation solutions where the only device connecting to the security manager 402 is the top element while the rest of the electronic devices communicate with the top element though the hierarchy communication links.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

While the invention has been described in conjunction with specific embodiments thereof, many alternatives, modifications and variations of such embodiments will be apparent to those of ordinary skill in the art in light of the foregoing description. For example, specialized hardware may be coupled to the electronic devices to provide a more robust secure perimeter around a hierarchy of electronic devices in a context.

In one embodiment, proximity keys are incorporated in the electronic devices so that the proximity keys need to be close in distance to electronic devices to enable them to work. In the event the electronic device is moved away from the proximity key by a predetermined threshold distance, an event is triggered. In one embodiment, high-speed synchronization storage systems are Wi-Fi enabled, and in case of an event, can synchronize with one or more electronic devices through high speed protocols.

In one embodiment, in a home context, the high-speed synchronization storage systems can be hidden from plain view and if somebody moves a laptop, a device of the hierarchy, when the owner of the home is on vacation, the high-speed synchronization storage system may send a message to the owner that its laptop is being moved. In one embodiment, house alarm systems can be modified so that when an event is triggered, the user's home (home context) alarm is also triggered in addition to the high speed synchronization with the top element. In one embodiment, additional hardware/software features may be added to the electronic devices to enable them to trigger events even when the electronic devices are in sleep mode. The term "sleep mode" herein refers to a low power consumption mode when the electronic device is not completely off, but most of its high power consuming logics and processors are turned off or operating on a low power supply level to conserve energy.

The embodiments of the invention are intended to embrace all such alternatives, modifications, and variations as to fall within the broad scope of the appended claims.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. At least one machine-readable storage medium having computer executable instructions stored thereon that, when executed, cause an electronic device to perform a method, the method comprising:
   identifying a current context;
   communicating among multiple electronic devices to identify a top element of a hierarchy of the multiple electronic devices for the current context using a leadership algorithm;
   receiving a role as the top element for the current context in the hierarchy;
   operating in accordance with the role in the hierarchy within a secure perimeter in the current context around the multiple electronic devices;
   periodically checking conformity with one or more context rules for each of electronic device among the multiple electronic devices; and
   triggering an event when a context rule, from among the one or more context rules, is activated.

2. The at least one machine-readable storage medium of claim 1, wherein identifying the top element of the hierarchy comprises performing one or more of:
   receiving assignment as the top element;
   electing, as the top element, one or more electronic devices from among the multiple electronic devices; or
   executing, in view of the current context, a leader election algorithm to identify the top element.

3. The at least one machine-readable storage medium of claim 1, having further computer executable instructions stored thereon that, when executed, cause the electronic device to perform a further method, the further method comprising:
   sending an acknowledgment message to other electronic devices, among the multiple electronic devices in the hierarchy, to confirm that all the electronic devices among the multiple electronic devices are part of the hierarchy.

4. The at least one machine-readable storage medium of claim 1, wherein the event comprises performing one or more of:
   securely shutting down itself or at least one of the electronic devices in the hierarchy that causes triggering of the event;
   synchronizing data with another machine;
   shutting down all the multiple electronic devices in the hierarchy;
   locking-in itself or at least one of the electronic device in the hierarchy that causes triggering of the event; or
   activating anti-theft protocol for itself or for at least one of the electronic device in the hierarchy.

5. The at least one machine-readable storage medium of claim 4, wherein the other machine is a cloud computing unit, and wherein synchronizing with the other machine comprises copying data to the cloud computing unit.

6. The at least one machine-readable storage medium of claim 1, wherein all electronic devices, among the multiple electronic devices, are shut down when the top element triggers an event indicating that the top element is outside the secure perimeter.

7. The at least one machine-readable storage medium of claim 1, wherein the context information comprises one or more of:
   physical proximity between electronic devices in the hierarchy;
   logical location of the electronic devices in the hierarchy;
   movement of an electronic device relative to other electronic devices in the hierarchy;
   strength of wireless internet connectivity of an electronic device relative to other electronic devices in the hierarchy;
   an event detected by soft or hard sensors of an electronic device in the hierarchy; or
   a message received from another electronic device in the hierarchy, the message to indicate an event in the current context.

8. An electronic device comprising:
   a logic unit to identify a current context; and
   a security agent to communicate among multiple electronic devices to identify a top element of a hierarchy of the multiple electronic devices for the current context using a leadership algorithm, to perform a role of the top element in the hierarchy in the current context identified by the logic, periodically check conformity with one or more context rules for each of electronic device among the multiple electronic devices and trigger an event when a context rule, from among the one or more context rules, is activate.

9. The electronic device of claim 8, wherein the security agent comprises a context awareness engine for receiving context information from other electronic devices among the multiple electronic devices.

10. The electronic device of claim 9, wherein the context information comprises one or more of:

physical proximity between electronic devices in the hierarchy;
logical location;
movement relative to other electronic devices in the hierarchy;
strength of wireless internet connectivity relative to other electronic devices in the hierarchy;
an event detected by soft or hard sensors; or
a message received from another electronic device in the hierarchy, the message to indicate an event in the current context.

11. The electronic device of claim 9, wherein the context awareness engine includes an agent rule to cause an event to trigger when the agent rule is activated.

12. The electronic device of claim 11, wherein the event, triggered when the agent rule is activated, comprises one or more of:
secure shut down of itself or at least one of the electronic device from among the multiple electronic devices in the hierarchy that causes the triggering of the event;
synchronize data with another machine;
shut down all the multiple electronic devices in the hierarchy;
lock-in of itself or at least one of the electronic device from among the multiple electronic devices in the hierarchy that causes the triggering of the event; or
activate anti-theft protocol for itself or at least one of the electronic device from among the multiple electronic devices in the hierarchy.

13. A server comprising:
a security manager module to:
register multiple electronic devices;
define one or more contexts for the registered multiple electronic devices for providing a secure perimeter in the one or more contexts around the multiple electronic devices; and
define a hierarchy for the multiple electronic devices according to the one or more contexts, wherein the security manager module is communicatively coupled to a security agent of an electronic device from among the multiple electronic devices in the hierarchy; and
identify a top element of a hierarchy of the multiple electronic devices for the current context using a leadership algorithm.

14. The server of claim 13, wherein the security manager module to:
define context rules for triggering an event by each of the electronic devices among the multiple electronic devices;
define the hierarchy by registering one or more electronic devices among the multiple electronic devices as a top element in the hierarchy;
receive data from the electronic device, which is the top element of the hierarchy, in response to triggering of an event; or
receive data for registering and administering configuration of the multiple electronic devices.

15. The server of claim 14, wherein the security manager module is communicatively coupled to a security agent of the electronic device which is the top element of the hierarchy.

16. The server of claim 14, wherein the security manager module to register one or more electronic devices as the top element by performing one or more of:
assigning one or more electronic devices, from among the multiple electronic device, as the top element;
receiving an input from one or more electronic devices, among the multiple electronic devices, that elected the top element from among the multiple electronic devices; or
executing, in view of the context, a leader election algorithm to identify the top element.

17. The server of claim 14, wherein the security agent in each of the electronic devices having logic to perform a function of the top element.

18. The server of claim 13, wherein the security agent includes a context awareness engine for receiving context information from other electronic devices among the multiple electronic devices.

19. The server of claim 18, wherein the context information comprises one or more of:
physical proximity between electronic devices in the hierarchy;
logical location of the electronic devices in the hierarchy;
movement of an electronic device relative to other electronic devices in the hierarchy;
strength of wireless internet connectivity of an electronic device relative to other electronic devices in the hierarchy;
an event detected by soft or hard sensors of an electronic device in the hierarchy;
or a message received from another electronic device in the hierarchy, the message to indicate an event in the current context.

20. The server of claim 13, wherein the security agent includes an agent rule to cause an event to trigger when the agent rule is activated.

21. The server of claim 20, wherein the security manager to perform, in response to the event triggered when the agent rule is activated, one or more of:
securely shutting down at least one of the electronic device in the hierarchy that causes the triggering of the event;
synchronizing data with another machine;
shutting down all the multiple electronic devices in the hierarchy;
locking-in at least one of the electronic device in the hierarchy that causes the triggering of the event; or
activating anti-theft protocol for at least one of the electronic device in the hierarchy.

* * * * *